United States Patent
Kraft

(10) Patent No.: US 11,255,558 B1
(45) Date of Patent: Feb. 22, 2022

(54) SYSTEMS AND METHODS FOR ESTIMATING AN INPUT POWER SUPPLIED TO A FAN MOTOR OF A CLIMATE CONTROL SYSTEM

(71) Applicant: Trane International Inc., Davidson, NC (US)

(72) Inventor: Wayne N. Kraft, Tyler, TX (US)

(73) Assignee: Trane International Inc., Davidson, NC (US)

( * ) Notice: Subject to any disclaimer, the term of this patent is extended or adjusted under 35 U.S.C. 154(b) by 110 days.

(21) Appl. No.: 16/714,199

(22) Filed: Dec. 13, 2019

(51) Int. Cl.
| | |
|---|---|
| *F24F 11/30* | (2018.01) |
| *F24F 11/56* | (2018.01) |
| *F24F 11/64* | (2018.01) |
| *F24F 11/65* | (2018.01) |
| *F24F 11/77* | (2018.01) |
| *F24F 11/89* | (2018.01) |
| *G05B 17/02* | (2006.01) |
| *H02P 23/14* | (2006.01) |
| *F24F 140/60* | (2018.01) |

(52) U.S. Cl.
CPC ............. *F24F 11/30* (2018.01); *F24F 11/56* (2018.01); *F24F 11/64* (2018.01); *F24F 11/65* (2018.01); *F24F 11/77* (2018.01); *F24F 11/89* (2018.01); *G05B 17/02* (2013.01); *H02P 23/14* (2013.01); *F24F 2140/60* (2018.01)

(58) Field of Classification Search
CPC .. F24F 11/30; F24F 11/56; F24F 11/64; F24F 11/89; F24F 11/65; F24F 11/77; F24F 2140/60; H02P 23/14; G05B 17/02
See application file for complete search history.

(56) References Cited

U.S. PATENT DOCUMENTS

| | | | |
|---|---|---|---|
| 5,492,273 | A | 2/1996 | Shah |
| 5,705,734 | A | 1/1998 | Ahmed |
| 6,223,544 | B1 | 5/2001 | Seem |
| 7,444,251 | B2 | 10/2008 | Nikovski et al. |
| 9,732,976 | B2 | 8/2017 | Wang et al. |
| 10,145,576 | B2 | 12/2018 | Boufounos et al. |
| 10,254,318 | B2 | 4/2019 | Shahi et al. |
| 10,852,044 | B1 * | 12/2020 | Elliott ................... F25B 49/025 |

(Continued)

FOREIGN PATENT DOCUMENTS

WO 2018226973 A1 12/2018

OTHER PUBLICATIONS

Kraft, Wayne N.; U.S. Appl. No. 16/654,956, filed Oct. 16, 2019; Title: Systems and Methods for Detecting Inaccurate Airflow Delivery in a Climate Control System; 48 pages.

*Primary Examiner* — Ramesh B Patel

(74) *Attorney, Agent, or Firm* — Womble Bond Dickinson (US) LLP

(57) ABSTRACT

Methods and related systems for estimating input power supplied to a fan motor of a climate control system are disclosed. In an embodiment, the method includes selecting an input power function of a fan motor class. Additionally, the method includes operating a fan of the climate control system to produce an airflow, wherein the fan includes the fan motor of the selected fan motor class. Further, the method includes measuring a speed and a torque of the fan motor, and estimating an input power of the fan motor by entering the speed and the torque of the fan motor into the selected input power function.

18 Claims, 6 Drawing Sheets

(56) References Cited

U.S. PATENT DOCUMENTS

| | | | |
|---|---|---|---|
| 2005/0278071 A1* | 12/2005 | Durham | G05D 23/1932 |
| | | | 700/276 |
| 2010/0101265 A1* | 4/2010 | Yokouchi | H02P 27/08 |
| | | | 62/426 |
| 2010/0204945 A1 | 8/2010 | Shahi et al. | |
| 2011/0181216 A1* | 7/2011 | Bass | H02P 6/28 |
| | | | 318/400.11 |
| 2012/0072029 A1 | 3/2012 | Persaud et al. | |
| 2013/0345995 A1 | 12/2013 | Shah et al. | |
| 2014/0244051 A1* | 8/2014 | Rollins | F04D 27/004 |
| | | | 700/282 |
| 2015/0233380 A1* | 8/2015 | Sasaki | F04D 27/004 |
| | | | 417/44.1 |
| 2017/0234561 A1 | 8/2017 | Lin et al. | |
| 2018/0088547 A1 | 3/2018 | Perez | |
| 2019/0280630 A1* | 9/2019 | Kraft | H02P 6/06 |
| 2019/0310670 A1* | 10/2019 | Pillai | G16H 40/20 |
| 2020/0240672 A1* | 7/2020 | Patil | F24F 11/77 |

* cited by examiner

SYSTEMS AND METHODS FOR ESTIMATING AN INPUT POWER SUPPLIED TO A FAN MOTOR OF A CLIMATE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Climate control systems, such as heating, ventilation, and/or air conditioning (HVAC) systems may generally be used in residential and/or commercial areas for heating and/or cooling to create comfortable temperatures inside those areas. Some climate control systems may be split-type air conditioning or heat pump systems. These systems typically have an indoor unit and an outdoor unit, which are capable of cooling a comfort zone by operating in a cooling mode for transferring heat from a comfort zone to an ambient zone using a refrigeration cycle. Heat pump systems are also generally capable of reversing the direction of refrigerant flow through the components of the climate control system so that heat is transferred from the ambient zone to the comfort zone, thereby heating the comfort zone. The indoor unit of a climate control system may include an indoor fan for providing airflow through the indoor unit and the outdoor unit of the system may similarly include an outdoor fan for providing airflow through the outdoor unit.

BRIEF SUMMARY

Some embodiments disclosed herein are directed to a method for estimating input power supplied to a fan motor of a climate control system. In an embodiment, the method includes selecting an input power function of a fan motor class, and operating a fan of the climate control system to produce an airflow, wherein the fan comprises the fan motor of the selected fan motor class. In addition, the method includes measuring a speed and a torque of the fan motor. Further, the method includes estimating an input power of the fan motor by entering the speed and the torque of the fan motor into the selected input power function.

Other embodiments disclosed herein are directed to a climate control system for an indoor space. In an embodiment, the climate control system includes a fan configured to produce an airflow, wherein the fan comprises a fan motor of a fan motor class. In addition, the climate control system includes a controller to be coupled to the fan, wherein the controller is configured to operate the fan of the climate control system to produce the airflow, and measure a speed and a torque of the fan motor as the fan produces the airflow. Further, the climate control system includes a memory coupled to a processor, wherein the memory includes instructions executable by the processor to cause the processor to store an input power function of the fan motor class, and estimate an input power of the fan motor by entering the measured speed and torque of the fan motor into the input power function stored in the controller.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
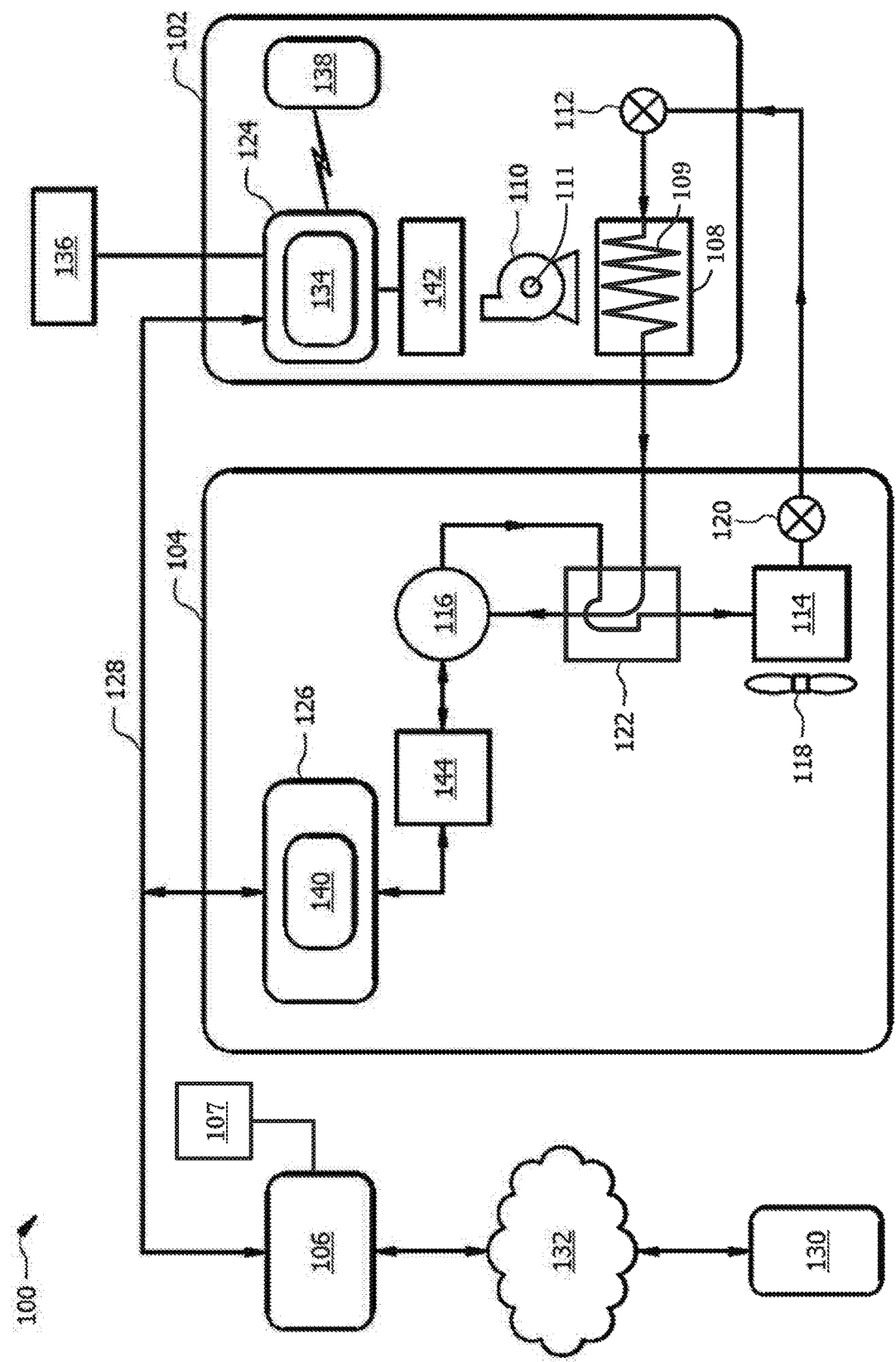
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As described above, an indoor unit of a climate control system may include an indoor fan for providing airflow through the indoor unit, and/or an outdoor unit of the system may similarly include an outdoor fan for providing airflow through the outdoor unit. By monitoring the amount of input power supplied to a motor of the indoor fan and/or a motor of the outdoor fan, the operation of the indoor and/or outdoor fans may be monitored to observe changes in the climate control system. For instance, increased power usage of the indoor and/or outdoor fans may indicate a decreased efficiency in the operation of the climate control system that may need to be addressed to ensure the climate control system functions as intended.

In some conventional climate control systems, a separate, dedicated sensor is utilized for directly measuring the input power supplied to the fan motor of the climate control system. However, the utilization of a dedicated sensor for measuring input power may increase the cost and complexity of the climate control system. Additionally, in some conventional climate control systems, a third party vendor utilizing specialized testing or commissioning equipment is relied upon for determining or verifying the input power supplied to the fan motor as part of the process for commissioning the climate control system, thereby increasing the time and cost required for performing the commissioning of the system.

Accordingly, embodiments disclosed herein include systems and methods for estimating an input power supplied to a fan motor of the climate control system without needing to directly measure the input power via a separate, dedicated sensor or specialized testing and/or commissioning equipment. Particularly, embodiments disclosed herein include systems and methods for estimating an input power supplied to a fan motor of the climate control system that includes determining an input power function for a plurality of fan motor classes for the climate control system, selecting the fan motor class of a fan motor of the climate control system, operating the fan of the climate control system to produce an airflow, measuring a speed and a torque of the fan motor of the fan of the climate control system, and estimating an input power of the fan motor from the input power function for the selected fan motor class. As will be described in more detail below, use of the embodiments disclosed herein may allow any increase in the estimated input power of the fan motor to be monitored by a user of the climate control system such that any issues or problems of the climate control system causing the increase in estimated power may be addressed.

Referring now to FIG. 1, a schematic diagram of a climate control system 100 according to some embodiments is shown. In this embodiment, climate control system 100 is a HVAC system, and thus, system 100 may be referred to herein as HVAC system 100. In the illustrated embodiment, HVAC system 100 comprises a heat pump system that may be selectively operated to implement one or more substantially closed thermodynamic refrigeration cycles to provide a cooling functionality (hereinafter "cooling mode"), a heating functionality (hereinafter "heating mode"), and/or an air circulation functionality (hereinafter "fan-only mode"). In other embodiments, the HVAC system is an air conditioner that may only provide cooling through use of the refrigeration cycle. The HVAC system 100, configured as a heat pump system, may comprise an indoor unit 102, an outdoor unit 104, and a system controller 106 that may generally control operation of the indoor unit 102 and/or the outdoor unit 104. In some embodiments, HVAC system 100 may instead comprise a packaged HVAC system that includes the function of the indoor unit 102 in a package located outdoors.

Indoor unit 102 generally includes an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 for channeling the refrigerant therethrough that segregates the refrigerant from any air flowing through indoor heat exchanger 108 during operations. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower or fan motor 111 configured to selectively rotate the blower impeller. The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be configured to deliver temperature-conditioned air from the indoor unit 102 to one or more areas and/or zones of an indoor space. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor 111 of the indoor fan 110.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger. While not specifically shown, it should be appreciated that outdoor heat exchanger 114 may include a coil similar to coil 109 previously described above for indoor heat exchanger 108.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may comprise a temperature sensor and/or may further be configured to control heating and/or cooling of zones associated with the HVAC system 100 (e.g., within the indoor space). In some embodiments, the system controller 106 may be configured as a thermostat, having a temperature sensor and a user interface, for controlling the supply of conditioned air to zones associated within the HVAC system 100.

The system controller 106 may be in communication with an input/output (I/O) unit 107 (e.g., a graphical user interface, a touchscreen interface, or the like), which may be combined with or remote from the system controller 106, for displaying information and for receiving user inputs. The I/O unit 107 may display information related to the operation of the HVAC system 100 (e.g., from system controller 106) and may receive user inputs related to operation of the HVAC system 100. During operations, the I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone, smartphone, laptop, tablet computer, and other portable computing/telecommunication devices. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 and/or the system controller 106 may be configured to communicate with an indoor fan controller 142 in signal communication with indoor fan motor 111 and/or otherwise affect control over operation of the indoor fan 110. For example, indoor fan controller 142 may measure speed and torque of indoor fan motor 111 and communicate the measured speed and torque of indoor fan motor 111 to indoor controller 124 and/or system controller 106. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, outdoor controller 126, compressor drive controller 144, indoor fan controller 142, and indoor EEV controller 138 may each comprise any suitable device or assembly which is capable of receiving electrical (or other data) signals and transmitting electrical (or other data) signals to other devices. In particular, while not specifically shown, controllers 106, 124, 126, 138, 142, and 144 may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of each controller 106, 124, 126, 138, 142, and 144 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126, 138, 142, and 144.

During operation, system controller 106 may generally control the operation of HVAC system 100 through the indoor controller 124, outdoor controller 126, compressor drive controller 144, indoor fan controller 142, and indoor EEV controller 138 (e.g., via communication bus 128). In the description below, specific control methods are described (e.g., methods 300, 370). It should be understood that the features of these described methods may be performed (e.g., wholly or partially) by system controller 106, and/or by one or more of controllers 124, 126, 138, 142, and 144 as directed by system controller 106. As a result, the controller or controllers of HVAC system 100 (e.g., controllers 106, 124, 126, 138, 142, and 144, etc.) may include and execute machine-readable instructions (e.g., non-volatile machine readable instructions) for performing the operations and methods described in more detail below. In some embodiments, each of the controllers 106, 124, 126, 138, 142, and 144 may be embodied in a singular control unit, or may be dispersed throughout the individual controllers 106, 124, 126, 138, 142, and 144 as described above.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through coil 109 of the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
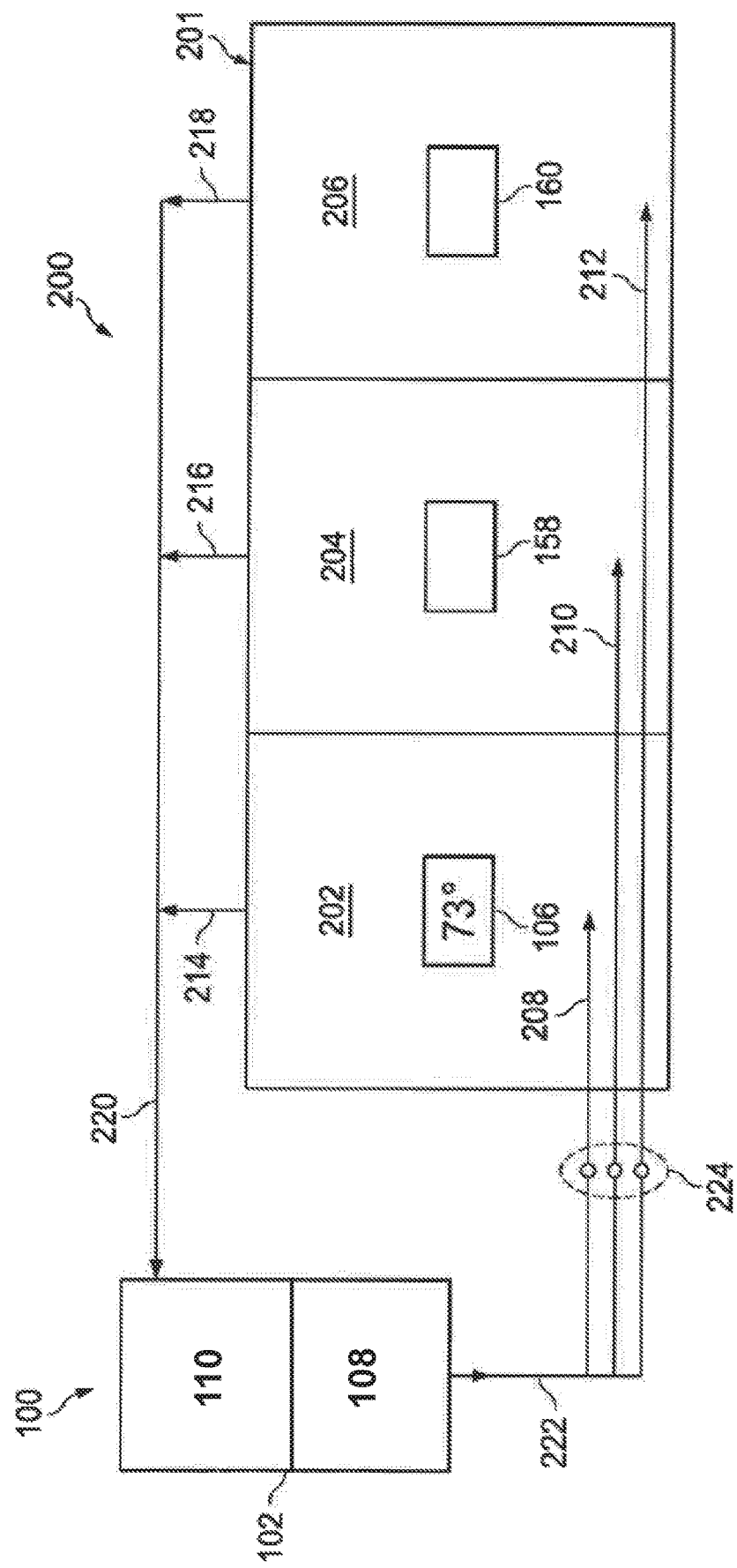
FIG. 2 is a schematic diagram of an air circulation path of the HVAC system of FIG. 1 according to an embodiment of the disclosure.

Referring now to FIG. 2, a schematic diagram of an air circulation path 200 of the HVAC system 100 of FIG. 1 is shown according to an embodiment of the disclosure. It will be appreciated that while three zones 202, 204, 206 are shown, any number of zones may be present in an indoor space or structure 201. Where present, the plurality of zones may be conditioned independently or together in one or more groups. The air circulation path 200 of the HVAC system 100 may generally comprise a first zone supply duct 208, a second zone supply duct 210, a third zone supply duct 212, a first zone return duct 214, a second zone return duct 216, a third zone return duct 218, a main return duct 220, and a main supply duct 222. A plurality of zone dampers 224 may be optionally provided. The air circulation path 200 also passes through the indoor unit 102, which may include an indoor heat exchanger 108 and an indoor fan 110. In some embodiments, the HVAC system 100 may be a ductless system, where an indoor unit 102 supplies conditioned air directly to, and receives return air directly from, a corresponding zone.

In operation, the indoor fan 110 may be configured to generate an airflow through the indoor unit 102 to deliver temperature conditioned air from an air supply opening in the indoor unit 102, through the main supply duct 222, and to each of the plurality of zones 202, 204, 206 through each of the first zone supply duct 208, the second zone supply duct 210, and the third zone supply duct 212, respectively. Additionally, each of the first zone supply duct 208, the second zone supply duct 210, and the third zone supply duct 212 may optionally comprise a zone damper 224 that regulates the airflow to each of the zones 202, 204, 206. In some embodiments, the zone dampers 224 may regulate the flow to each zone 202, 204, 206 in response to a temperature or humidity sensed by at least one temperature sensor and/or humidity sensor carried by at least one of the system controller 106, a zone thermostat 158, and a zone sensor 160. In some embodiments, system controller 106 may be located external of structure 201, and structure 201 may not include zone thermostat 158 and/or zone sensor 160.

Air from each zone 202, 204, 206 may return to the main return duct 220 through each of the first zone return duct 214, the second zone return duct 216, and the third zone return duct 218. From the main return duct 220, air may return to the indoor unit 102 through an air return opening in the indoor unit 102. Air entering the indoor unit 102 through the air return opening may then be conditioned for delivery to each of the plurality of zones 202, 204, 206 as described above. Circulation of the air in this manner may continue repetitively until the temperature and/or humidity of the air within the zones 202, 204, 206 conforms to a target temperature and/or humidity as required by at least one of the system controller 106, the zone thermostat 158, and/or the zone sensor 160.

To operate the HVAC system 100 in the so-called fan-only mode, indoor fan 110 of indoor unit 102 may be operated to circulate air to the plurality of zones 202, 204, 206 of structure 201. When HVAC system 100 is operated in the fan-only mode, compressor 116 of outdoor unit 104 may not be operated so that refrigerant is not circulated through indoor heat exchanger 108. Thus, when HVAC system 100 is operated in the fan-only mode, air may be circulated to the plurality of zones 202, 204, 206 of structure 201 without conditioning the air via transferring heat between the air and refrigerant circulated through indoor heat exchanger 108.

As described above, during operation, a request may be communicated to indoor fan controller 142 (shown in FIG. 1) of indoor fan 110 from system controller 106 (shown in FIG. 1) representative of, or corresponding to, a desired airflow. Based on this requested air flow command and prior knowledge of the performance of indoor fan 110 in the indoor product application, the system controller 106 may estimate the airflow and the external static pressure (ESP) provided by indoor fan 110 by continuously measuring motor speed and torque of the motor of indoor fan 110. Particularly, components of indoor unit 102, including indoor heat exchanger 108 and indoor fan 110, may be housed within a cabinet to form a self-contained air handling unit (AHU). Prior to installation of indoor unit 102 at structure 201, the AHU of indoor unit 102 (or another test AHU, including a test indoor fan, similar in configuration to the AHU of indoor unit 102) may be tested at an air plenum test facility at a range of known airflows and ESPs (i.e., independently measured by equipment of the test facility) to thereby create AHU maps correlating airflow and ESP of the AHU with motor speed and torque of the indoor fan 110 of the AHU. As a non-limiting example, a first AHU map may include airflow along an X-axis thereof, motor power (which may be calculated from a measured motor torque) along a Y-axis thereof, and a plurality of curves each corresponding to a fixed motor speed. In this manner, an estimated airflow may be "looked-up" from the AHU map from a known motor speed and torque. A second AHU map may include airflow along an X-axis thereof, ESP along a Y-axis thereof, and a plurality of curves each corresponding to a fixed motor speed, from which an estimated ESP may be looked-up given the known motor speed and airflow (determined from the first AHU map). However, additional functional relationships for airflow and ESP may be used to correlate measured motor speed and torque with estimated airflow and ESP.

The AHU maps created during testing may be stored in the memory of the system controller 106. In this manner, system controller 106 of HVAC system 100 may apply measured motor speed and torque values communicated to system controller 106 from indoor fan controller 142 to the AHU maps stored in the memory of system controller 106 to thereby determine or look-up an estimated airflow of the indoor fan 110 corresponding to the measured motor speed and torque of the indoor fan 110. In some embodiments, the AHU maps may be stored in a memory of indoor fan controller 142, and indoor fan controller 142 may apply measured motor speed and torque values to the AHU maps stored in the memory thereof to determine the estimated airflow of indoor fan 110 corresponding to the measured motor speed and torque of the indoor fan 110.

Figure 3:
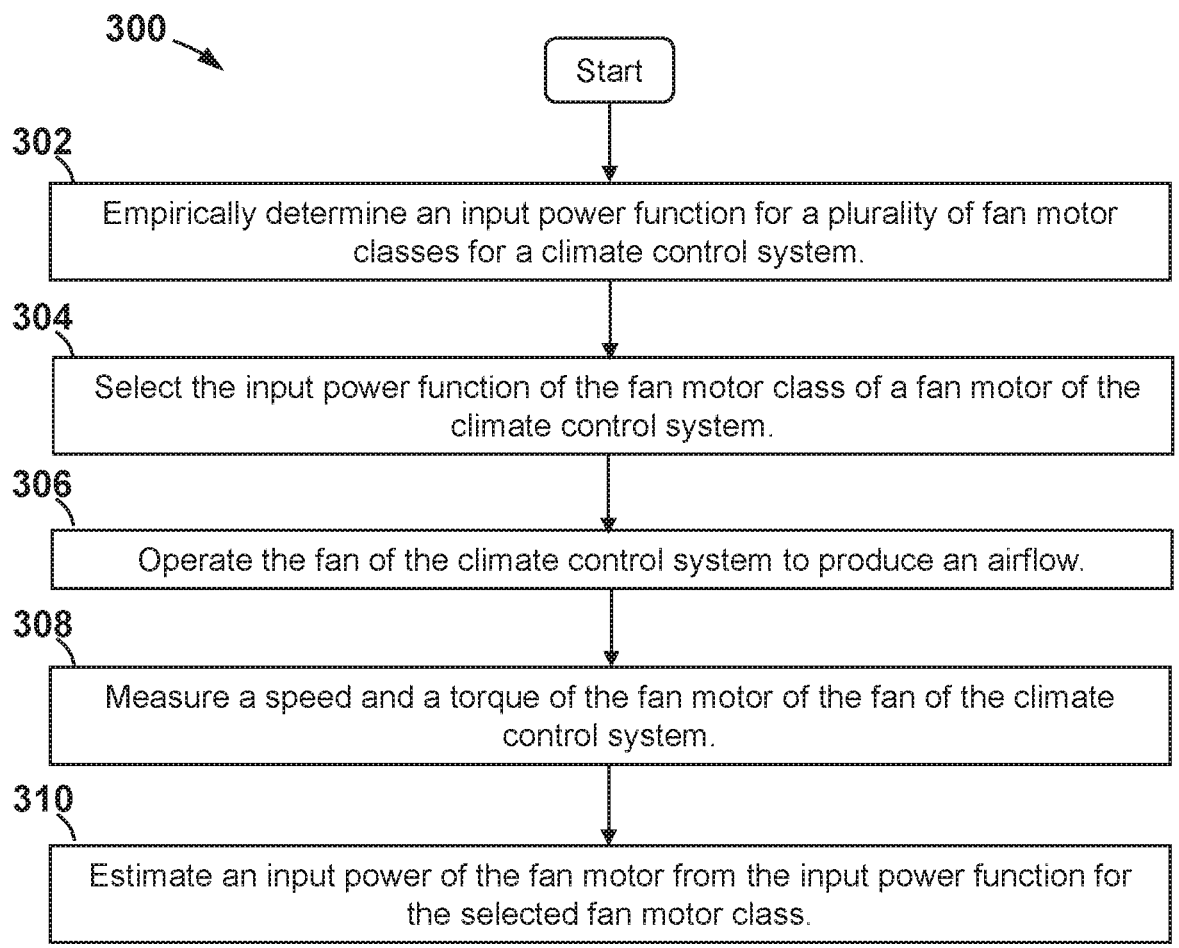
FIG. 3 is a flow chart of a method for estimating an input power supplied to a fan motor of a climate control system according to some embodiments.

Referring now to FIGS. 1-3, a method 300 for estimating an input power supplied to a fan motor of a climate control system is shown in FIG. 3. In some embodiments, method 300 may be practiced with HVAC system 100. Thus, in describing the features of method 300, continuing reference will made to the HVAC system 100 shown in FIGS. 1, 2; however, it should be appreciated that embodiments of method 300 may be practiced with other systems, assemblies, and devices.

Generally speaking, method 300 includes determining an input power function for each of a plurality of fan motor classes for a climate control system, selecting one of the fan motor classes for which an input power function has been determined, operating a fan of the climate control system comprising the selected fan motor class, and estimating an input power of the fan motor from the input power function for the selected fan motor class. Method 300 may also include measuring speed and torque of the fan motor as the fan is operated to produce an airflow.

Initially, method 300 includes determining an input power function for a plurality of fan motor classes for a climate control system at block 302. In some embodiments, block 302 comprises determining a plurality of input power functions for different fan motor classes, where the input power estimated using the input power function of each fan motor class is expressed as a function of a speed and a torque of a fan motor of the selected fan motor class. In this embodiment, each fan motor class is defined by a maximum output power of the fan motor and a voltage of the fan motor. For example, a 120 volt (V) fan motor having a maximum output power of 1 horsepower (HP) comprises a first fan motor class; a 120 V fan motor having a maximum output power of 2 HP comprises a second fan motor class, a 240 V fan motor having a maximum output power of 2 HP comprises a third fan motor class, and so on and so forth. However, in other embodiments, each fan motor class may be defined by parameters of the fan motor in addition to the voltage and maximum output power of the fan motor Block 302 of method 300 may comprise testing different test fan motors corresponding to different fan motor classes at a testing facility using a dynamometer and associated testing equipment configured to supply a measured or known input power to the test fan motor and to measure a speed and torque outputted by the test fan motor in response to being supplied by the measured input power. The dynamometer and associated testing equipment may thereby be used to construct or empirically determine a plurality of fan motor maps each depicting input power of a particular test fan motor tested by the dynamometer and associated testing equipment as a function of fan motor speed and torque.

Figure 4:
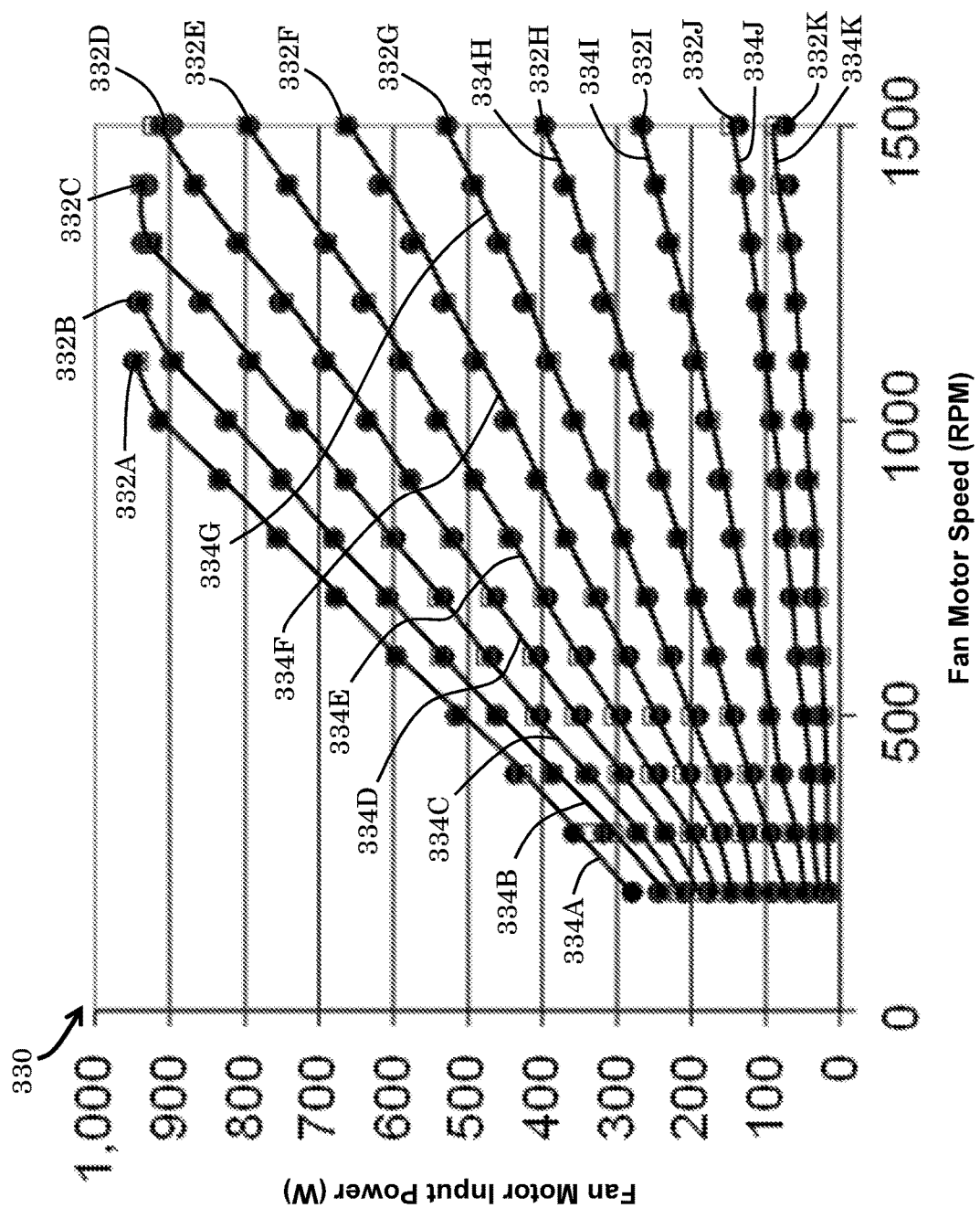
FIG. 4 is a graph illustrating a fan motor map for a fan motor of a fan motor class according to some embodiments.

Referring briefly to FIG. 4, an exemplary fan motor map 330 is shown that illustrates fan motor speed in revolutions per minute (RPM) on an X-axis thereof and fan motor input power in watts (W) on a Y-axis thereof. Exemplary fan motor map 330 includes test data measured from a single fan motor of a given fan motor class, where the measurements were performed at a testing facility by a dynamometer and associated test equipment. In this example, the test data depicted in fan motor map 330 is measured from a test fan motor of a fan motor class corresponding to 1 HP maximum output power and 240 V. Circles 332A-332K depict measured fan motor input power as a function of measured fan motor speed at a given measured torque (illustrated, for clarity, by curves 334A-334K in FIG. 4), where the motor fan input power, speed, and torque depicted by each circle 332A-332K are measured by the dynamometer and associated testing equipment. Particularly, one or more dynamometer runs may be executed using the dynamometer and associated testing equipment whereby input power supplied to the test fan motor is gradually increased from zero and fan motor speed and torque measurements are captured until the maximum power (1 HP maximum output power for the fan motor of fan motor map 330) is reached.

The torque curves 334A-334K shown on fan motor map 330 are not constructed by the dynamometer and associated testing equipment and are only included in fan motor map 330 to clearly identify circles 332A-332K without needing to label each individual circle 332A-332K. For instance, curve 334A pertaining to a first torque of the test fan motor extends through each of the circles 332A; curve 334B pertaining to a second torque of the test fan motor that is different from the first torque extends through each of the circles 332B, and so on and so forth. For example, one of the plurality of circles 332A of fan motor map 330 depicts a measured fan input power of approximately 510 W at a measured fan motor speed of approximately 500 RPM and at a measured torque 334A, where measured torque 334A is approximately 8 Newton-meters (N-m). As another example, another of the plurality of circles 332A of fan motor map 330 depicts a measured fan input power of approximately 910 W at a measured fan motor speed of approximately 1,000 RPM and at the measured torque 334A of approximately 8 N-m. As a further example, one of the plurality of circles 332C of fan motor map 330 depicts a measured fan input power of approximately 725 W at a measured fan motor speed of approximately 1,000 RPM and a fan motor measured torque 334C, where measured torque 334C is approximately 6 N-m. In this manner, fan motor map 330 relates input power to speed and torque for a test fan motor of a particular fan motor class.

Referring again to FIG. 3, block 302 of method 300 may include constructing multiple fan motor maps similar in construction to the fan motor map 330 shown in FIG. 4 but of fan motors of a class different from the fan motor of fan motor map 330. Block 302 may particularly include constructing a fan motor map for each common class of fan motor used in climate control systems. For example, block 302 may comprise constructing fan motor maps for common fan motor classes for indoor units of climate control systems (e.g., indoor fan motor 111 of the HVAC system 100 shown in FIGS. 1, 2). In some embodiments, block 302 comprises constructing a fan motor map for a fan motor of the same class as the indoor fan motor 111 of the HVAC system 100 shown in FIG. 1 prior to the installation of HVAC system 100. The fan motor maps that may be constructed at block 302 of method 300 may be constructed by a manufacturer and/or installer of the climate control system.

In some embodiments, block 302 of method 300 includes determining the input power function for a given fan motor class from the data captured in a fan motor map for the given fan motor class. For instance, without being limited to this or any other theory, the input power function for a given fan motor class determined at block 302 may comprise the following computation, wherein fan motor input power in watts is represented by $W_{input}$, fan motor speed in RPM is represented by N, fan motor output power in watts is represented by $W_{shaft}$, and A0-A8 comprise motor coefficients specific to the fan motor class:

$$W_{input} = \left\{ \frac{(A0 + A1 \times N^2 + A3 \times W_{shaft})}{(A4 + A5 \times W_{shaft} + A6 \times W_{shaft}^2 + A7 \times N + A8 \times N^2)} \right\} \quad (1)$$

Particularly, coefficients A0-A8 of Equation (1) may be determined from a regression of the motor speed, motor torque, and input power measured during the construction of the fan motor map at a testing facility for a fan motor of a given class. Coefficients A0-A8 are therefore specific or tailored to each fan motor class, and thus will vary between different fan motor classes. Additionally, without being limited to this or any other theory, fan motor output power $W_{shaft}$ may be determined using the following computation, where fan motor torque in N-m is represented by T:

$$W_{shaft} = N \times T \times \left( \frac{2 \times \pi}{60} \right) \quad (2)$$

Thus, block 302 of method 300 may comprise determining Equation (1) where Equation (1) comprises an input power function that expresses fan motor input power $W_{input}$ as a function of fan motor speed N and fan motor torque T given that the fan motor output power $W_{shaft}$ may be determined from the fan motor speed N and fan motor torque T via Equation (2) above. In other embodiments, block 302 may comprise estimating fan motor output power based on an estimated efficiency of the fan motor. For instance, without being limited to this or any other theory, in this alternative embodiment the input power function for a given fan motor class determined at block 302 may comprise the following computation, wherein the estimated efficiency of the fan motor is represented by $W_{eff}$:

$$W_{input} = \left( \frac{W_{shaft}}{W_{eff}} \right) \quad (3)$$

The fan motor efficiency of Equation (3) may be estimated as a function of fan motor speed and fan motor torque and a set of coefficients determined from a regression of the motor speed, motor torque, and input power measured during the construction of a fan motor map at a testing facility for a fan motor of a given class.

Block 302 of method 300 may also comprise storing a plurality of input power functions in a system controller of the climate control system (e.g., system controller 106 of the HVAC system 100 shown in FIGS. 1, 2) each comprising an Equation (1) that includes the specific set of coefficients A0-A8 entered therein for the specific fan motor class. For instance, a first input power function may be stored in the system controller comprising a first Equation (1) that includes a first set of coefficients A0-A8 corresponding to a first motor class, a second input power function may be stored in the system controller comprising a second Equation (1) that includes a second set of coefficients A0-A8 corresponding to a second motor class, and so on and so forth. Given that each input power function stored in the system controller is specific to a fan motor class, and not any particular fan motor model of the fan motor class, the total number of input power functions for a given number of fan motor models may be reduced, thereby lessening the memory and computational demands placed on the system controller.

Further, any additional error resulting from estimating the input power of a fan motor by utilizing an input power function tailored to the class of the fan motor, rather than the model of the fan motor, is generally minor (e.g., input power error being less than 10-15 W outside of operational envelopes of the fan motor that are generally uncommon in climate control systems). For example, the additional error may be relatively minor except for when the fan motor is operating at a low speed and a high torque, a combination that is generally uncommon in the operation of fan motors in climate control systems. Thus, the demands placed on the system controller may be minimized by tailoring each stored input power function to a specific fan motor class while still providing an accurate estimation (e.g., input power error being less than 10-15 W) for typical operating envelopes of the fan motor in climate control systems.

Once the input power function is determined at block 302, method 300 proceeds at block 304 by selecting the input power function of the fan motor class for a fan motor of the climate control system. In some embodiments, block 304 comprises querying a user or technician of the climate control system to identify the fan motor class of the fan motor of the climate control system. In some embodiments, block 304 may comprises querying an installer of the climate control system or a technician equipped to service the climate control system to identify the maximum output power and voltage of the fan motor of the fan of the climate control system. For example, block 304 may include querying an installer of HVAC system 100 or a technician equipped for servicing HVAC system 100 to enter into I/O unit 107 of HVAC system 100 the maximum output power and voltage of the indoor fan motor 111 of indoor fan 110. For instance, a technician may visually inspect the indoor fan motor 111 to identify the model of the indoor fan motor 111 to determine the maximum power output and voltage of indoor fan motor 111. In other embodiments, an installer or technician may enter the maximum output power and voltage of indoor fan motor 111 into device 130.

In certain embodiments, a processor, including a processor of system controller 106 of HVAC system 100 and/or a processor of communication network 132, selects the input power function of the fan motor class for indoor fan 111 based on the identification of the fan motor class made by the user or technician of HVAC system 100. In other embodiments, the fan motor class for indoor fan 111 may be pre-stored in a memory of the processor and thus the processor may automatically select the fan motor class without querying the user or technician of HVAC system 100. For example, the fan motor class of indoor fan motor 111 may be pre-programmed into the processor by the manufacturer of HVAC system 100. Alternatively, the fan motor class for indoor fan 111 may be pre-stored in other components of HVAC system 100 (e.g., in a memory of indoor fan controller 142, etc.) and communicated to the processor.

The maximum output power and voltage of the indoor fan motor 111 may be communicated from I/O unit 107 to system controller 106 of HVAC system 100 so that the entered maximum output power and voltage of indoor fan motor 111 may be saved or programmed into the memory of system controller 106.

Following the selection of the fan motor class of the fan of the climate control system at block 304, method 300 proceeds by operating the fan of the climate control system to produce an airflow at block 306. In some embodiments, block 306 comprises placing the climate control system into a heating or cooling mode to circulate air through an indoor space until a temperature and/or a humidity of the air within the indoor space conforms to a target temperature as required by a system controller and/or thermostat of the climate control system. For example, block 306 may comprise a homeowner operating I/O unit 107 of system controller 106 to select a target temperature for at least one of the zones 202, 204, and 206 of structure 201 and placing HVAC system 100 into one of a heating mode and a cooling mode to circulate air through structure 201 such that the temperature in the selected zone of zones 202, 204, 206 conforms to the selected temperature set by the homeowner. As another example, an installer of HVAC system 100 or a technician equipped to service HVAC system 100 may operate I/O unit 107 and/or device 130 to select a target temperature for at least one of the zones 202, 204, and 206 of structure 201 and place HVAC system 100 into one of a heating mode and a cooling mode to circulate air through structure 201 such that the temperature in the selected zone of zones 202, 204, 206 conforms to the selected temperature set by the installer or technician.

As the fan of the climate control system is operated to produce an airflow at block 306, method 300 includes measuring speed and torque of the fan motor of the fan of the climate control system at block 308. In some embodiments, block 308 comprises measuring speed and torque of the indoor fan motor 111 of the indoor fan 110 of HVAC system 100 as indoor fan motor 111 produces airflow through an indoor space. For instance, block 308 may include indoor fan controller 142 continuously measuring speed and torque values of indoor fan motor 111 and communicating the measured speed and torque as speed and torque values to system controller 106 where the measured speed and torque values may be saved into the memory thereof. In other embodiments, block 308 may comprise periodically communicating measured speed and torque values of indoor fan motor 111 to communication network 132 for logging in a database stored in a remote server of communication network 132.

During or following the measurement of speed and torque of the fan motor of the climate control system at block 308, method 300 proceeds by estimating an input power of the fan motor from the input power function for the selected fan motor class at block 310. In certain embodiments, a processor, including a processor of system controller 106 of HVAC system 100 and/or a processor of communication network 132, estimates an input power of input fan motor 111 from the input power function for the selected fan motor class at block 310. In some embodiments, block 310 comprises inputting the measured speed and torque of the fan motor into Equation (2) above to calculate or determine the output power $W_{shaft}$ of the fan motor, and inputting the calculated output power $W_{shaft}$ and measured speed of the indoor fan into Equation (1) above, which comprises the input power function for the fan motor class of the fan motor of the climate control system, to estimate the input power $W_{input}$ of the indoor fan motor of the climate control system. As described above, coefficients A0-A8 of Equation (1) are determined for the fan motor class selected at block 304, coefficients A0-A8 for the selected fan motor class being determined at block 302.

In some embodiments, block 310 comprises continuously outputting or determining the input power of the fan motor over time at periodic intervals (e.g., every 5-15 seconds, for example). For example, a first input power $W_{input1}$ of the fan motor may be determined at a first point in time ($t_1$) by inputting a first fan motor speed $N_1$ and first fan motor torque $T_1$ measured at time $t_1$ into Equation (2) above to determine a first output power $W_{shaft1}$ of the fan motor at time $t_1$. The output power $W_{shaft1}$ and fan motor speed $N_1$ may then be entered into Equation (1) above to determine a first input power $W_{input1}$ of the fan motor a time $t_1$. Similarly, a second input power $W_{input2}$ of the fan motor may be determined at a second point in time ($t_2$) that follows time $t_1$ after a predetermined time period has elapsed (e.g., between 5-15 seconds) by inputting a second fan motor speed $N_2$ and second fan motor torque $T_2$ measured at time $t_2$ into Equation (2) above to determine a second output power $W_{shaft2}$ of the fan motor at time $t_2$. The second output power $W_{shaft2}$ and second fan motor speed $N_2$ may be entered into Equation (1) above to determine a second input power $W_{input2}$ of the fan motor at time $t_2$.

Figure 5:
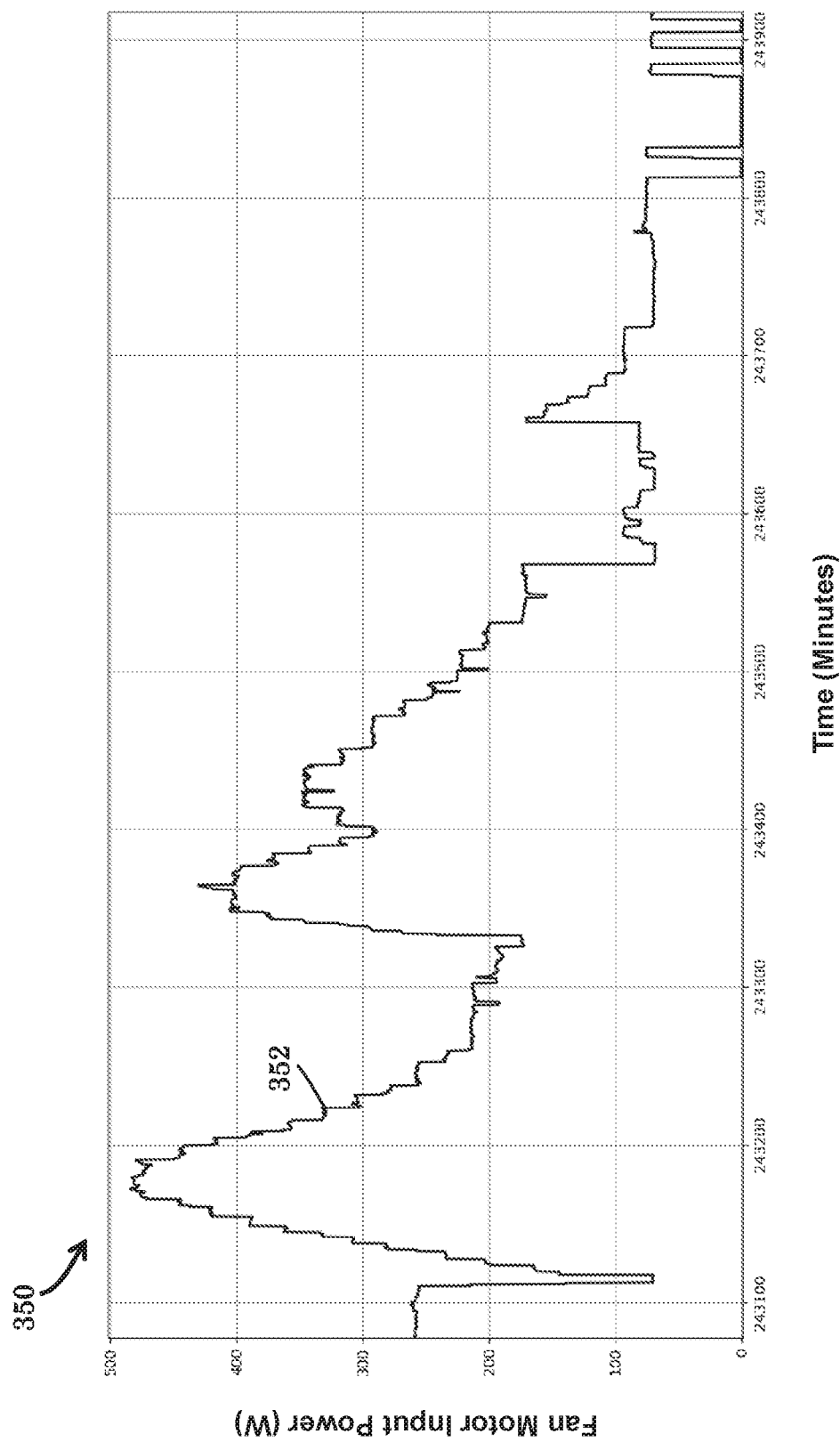
FIG. 5 is a graph illustrating an estimated input power supplied to a fan motor of a climate control system according to some embodiments.

The input power values (e.g., $W_{input1}, W_{input2} \ldots W_{inputN}$) continuously determined at block 310 may be logged in the memory of system controller 106 and/or in a database stored in a remote server of communication network 132. Additionally, block 310 may include graphically displaying the continuously determined input power values to a user of the climate control system. For example, referring briefly to FIG. 5, an exemplary input power graph 350 is shown that illustrates time (Minutes) on an X-axis thereof and estimated fan motor input power in watts (W) on a Y-axis thereof. Particularly, input power graph 350 illustrates an estimated input power curve 352 comprising the input power values (e.g., $W_{input1}, W_{input2} \ldots W_{inputN}$) continuously determined at block 310. In some embodiments, block 310 comprises depicting input power graph 350 on a screen of I/O unit 107 and/or device 130 of HVAC system 100 so that the estimated input power supplied to indoor fan 110 may be monitored by a user of HVAC system 100, such as a homeowner, an installer of HVAC system 100, and a technician equipped to service HVAC system 100.

In some embodiments, the estimated input power determined at block 310 may be used to identify potential issues of the climate control system or a decreased efficiency of the climate control system over time that may need to be addressed in order to ensure proper functioning of the climate control system. For example, an increase in estimated input power determined at block 310 over time may indicate an impending failure of the fan motor, and thus, method 300 may additionally include servicing or replacing the fan motor by the installer or technician equipped to service the climate control system in response to an increase in estimated input power supplied to the fan motor.

An increase in estimated input power over time may also indicate an increased resistance to airflow through the indoor space, which may be due to obstructions in the ducts of the indoor space (e.g., obstructions in main supply duct 222 and/or main return duct 220 of the structure 201 shown in FIG. 2), an inadvertently closed zone damper (e.g., zone dampers 224 of structure 201), and/or due to a clogged indoor air cleaner (e.g., air cleaner 136 of the HVAC system 100 shown in FIG. 1). Thus, method 300 may further include a user of the climate control system (e.g., a homeowner, installer, and/or qualified technician) eliminating or mitigating an obstruction to airflow through the indoor space, such as via removing an obstruction from one or more ducts of the indoor space, opening and/or closing one or more dampers of the indoor space, and/or replacing an indoor air cleaner of the climate control system, in response to an increase in the input power estimated at block 310. Additionally, method 300 may include issuing an alarm (e.g., via I/O unit 107 and/or device 130 of the HVAC system 100 shown in FIGS. 1, 2) to a user of the climate control system (e.g., a homeowner, installer, and/or qualified technician) to service at least one component of the climate control system (e.g., a fan, duct, damper, etc.) in response to an increase in the input power estimated at block 310.

In some embodiments, system controller 106 may measure the temperature of the indoor fan motor 111 (e.g., via a dedicated motor temperature sensor in signal communication with system controller 106) as the estimated input power of indoor fan motor 111 is determined. Particularly, the coefficients determined from the fan motor map (e.g., coefficients A0-A8 of Equation (1) presented above) are dependent upon the temperature of the test fan motor at the time of testing. During the construction of the fan motor map, the test fan motor may be operated at the testing facility at an operating or testing temperature that is greater than the temperature of the test fan motor at idle. Thus, the accuracy of an estimated input power may be reduced for a fan motor operating at a temperature that deviates from the testing temperature of the test fan motor (e.g., a fan motor that has just been transitioned from an idle mode and has not had sufficient time to reach the testing temperature). In some embodiments, an estimated input power of indoor fan motor 111 may be treated as spurious and ignored by system controller 106 if the indoor fan motor 111 has not yet reached a temperature consistent with the testing temperature of the test fan motor used to construct the fan motor map. For example, system controller 106 may not issue an alarm to a user of HVAC system 100 following an increase in the input power estimated at block 310 where the indoor fan motor 111 is operating at a temperature that deviates from the testing temperature at the time the increase in input power is estimated.

Although examples of method 300 are discussed above with respect to indoor fan 110 of the HVAC system 100 shown in FIGS. 1, 2, in other examples, the steps of method 300 may be performed with respect to outdoor fan 118 of HVAC system 100 to thereby estimate an input power supplied to a fan motor of outdoor fan 118.

Figure 6:
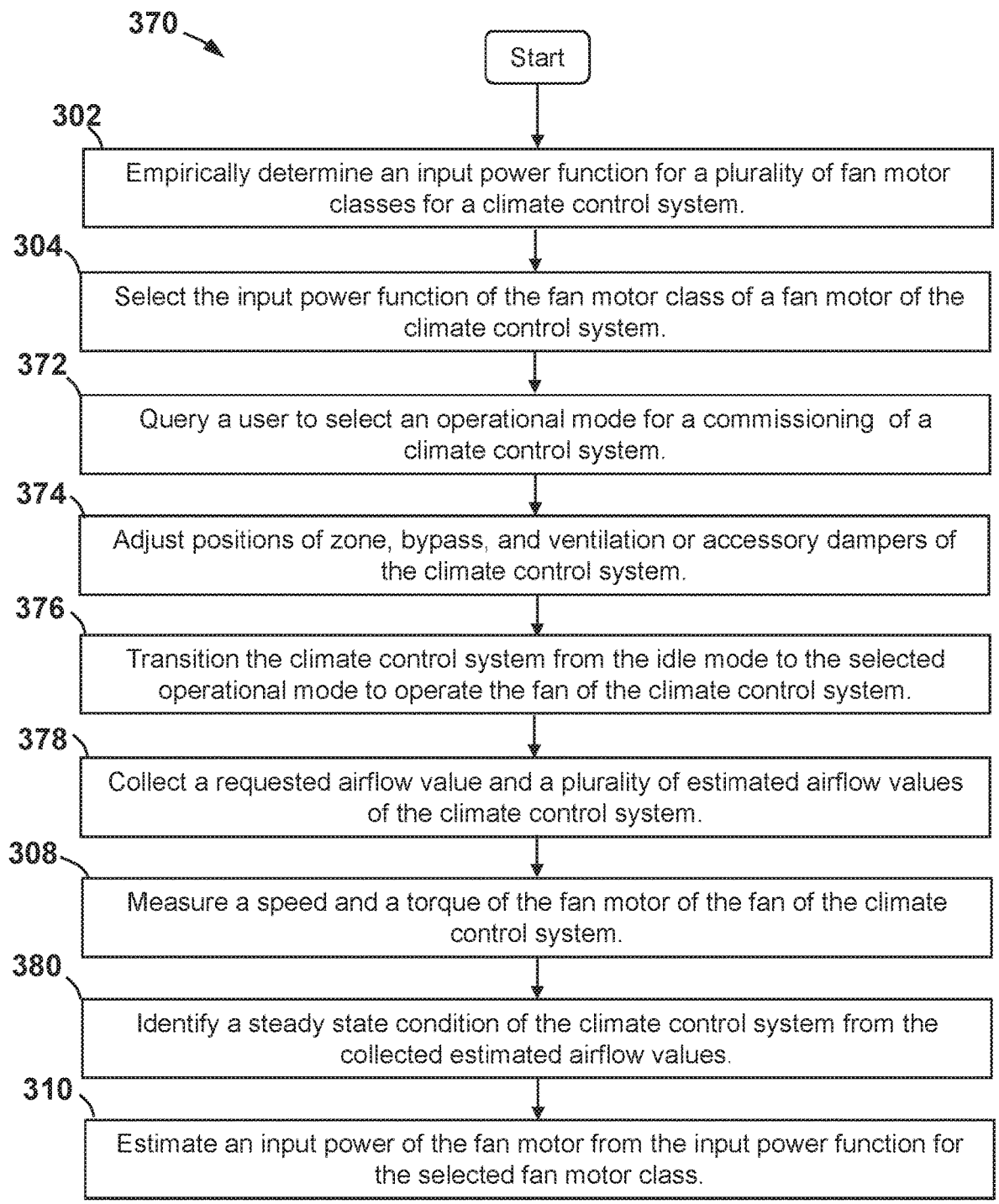
FIG. 6 is a flow chart of a method for commissioning a climate control system according to some embodiments.

As described above, the input power supplied to the fan of the climate control system (e.g., indoor fan 110 of the HVAC system 100 shown in FIGS. 1, 2) may be estimated upon the commissioning of the climate control system following installation of the system. Referring now to FIGS. 1, 2, and 6, a method 370 for commissioning a climate control system is shown in FIG. 6. Generally speaking, method 370 includes determining an input power function for each of a plurality of fan motor classes for a climate control system, selecting one of the fan motor classes for which an input power function has been determined, configuring the climate control system for commissioning, and estimating an input power of the fan motor from the input power function for the selected fan motor class. As will be described further herein, method 370 includes the performance of some of the method steps of method 300 shown in FIG. 3. In some embodiments, method 370 may be practiced with HVAC system 100. Thus, in describing the features of method 370, continuing reference will made to the HVAC system 100 shown in FIGS. 1, 2; however, it should be appreciated that embodiments of method 370 may be practiced with other systems, assemblies, and devices.

Initially, method 370 includes determining an input power function for a plurality of fan motor classes for a climate control system at block 302, as described above with respect to method 300 shown in FIG. 3. Once the input power function is determined at block 302, method 370 proceeds by selecting the input power function of the fan motor class for a fan motor of the climate control system at block 304, also as described above with respect to method 300 shown in FIG. 3. In some embodiments, block 304 of method 370 particularly includes querying an installer or technician charged with commissioning the climate control system to identify the fan motor class of the fan of the climate control system.

Method 370 also includes querying a user of the climate control system to select an operational mode for a commissioning of the climate control system at block 372. Block 372 of method 370 may be performed prior to, concurrently with, or after the performance of block 304. The user of the climate control system queried at block 372 (e.g., a homeowner, an installer of the climate control system, and/or a technician equipped to service the climate control system) may be the same or a different user than the user of the climate control system queried at block 304 of method 370.

In some embodiments, block 372 comprises querying the user to select between heating, cooling, and fan-only modes of the climate control system (e.g., the heating, cooling, and fan-only modes of HVAC system 100 described above). The climate control system may be in an idle mode at block 372 where a fan of the climate control system (e.g., indoor fan 110 of HVAC system 100 shown in FIG. 1) remains idle and does not produce an airflow through the indoor space (e.g., structure 201 shown in FIG. 2), and where no request for airflow through the indoor space has been called for by a controller of the climate control system (e.g., system controller 106 of HVAC system 100). A compressor of the climate control system (e.g., compressor 116 of HVAC system 100) is also inactive during the idle mode such that refrigerant is not actively being circulated through a heat exchanger of the climate control system (e.g., heat exchanger 108 of HVAC system 100). Block 372 may comprise displaying a graphic on the I/O unit 107 and/or device 130 of HVAC system 100 instructing the user of HVAC system 100 to select one of a fan-only, a cooling, and a heating mode of the HVAC system 100 for commissioning HVAC system 100. The user may enter the selected operational mode into I/O unit 107 and/or device 130, and the selected operational mode may be communicated from I/O unit 107 and/or device 130 to system controller 106.

Once the fan motor class has been selected at block 304 and the operational mode for commissioning the climate control system has been selected at block 372, method 370 may proceed by adjusting positions of zone, bypass, and ventilation or accessory dampers of the climate control system at block 374. In some embodiments, block 374 comprises opening each zone damper and closing each bypass and ventilation damper of the climate control system. For example, block 374 may comprise transmitting a command from system controller 106 of the HVAC system 100 shown in FIGS. 1, 2 to a motor controller of each zone damper 224 (shown in FIG. 2) instructing a motor of the zone damper 224 to actuate the zone damper 224 into an open position. Block 374 may also comprise transmitting a command from system controller 106 of HVAC system 100 to a motor controller of each bypass and ventilation damper (not shown in FIGS. 1, 2) of HVAC system 100 instructing a motor of each bypass and ventilation damper to actuate the bypass and ventilation damper into a closed position. Alternatively, the user of the climate control system may manually actuate each zone damper into the open position and manually actuate each bypass damper and ventilation damper into the closed position.

Block 374 of method 370 may further include opening (e.g., via a user of the climate control system) any floor and/or ceiling registers of the climate control system. As will be described further herein, the opening of zone, bypass, and ventilation dampers (and floor and ceiling registers where applicable) allows for the input power supplied to the fan motor of the climate control system to be estimated or verified without the influence of dampers, registers, and/or other controllable airflow obstructions which interfere or obstruct the delivery of airflow when disposed in a closed position. In some embodiments, method 370 may not include block 374. For instance, method 370 may not include block 374 when commissioning a climate control system that is not zoned and thus does not include zone dampers (e.g., zone dampers 224 of structure 201 shown in FIG. 2).

Following the adjustment of the dampers of the climate control system at block 374, method 370 proceeds by transitioning the climate control system from the idle mode to the selected operational mode to operate the fan of the climate control system at block 376. In some embodiments, block 376 comprises communicating a request from system controller 106 to the indoor fan controller 142 of the indoor fan 110 of HVAC system 100 representative of, or corresponding to, a desired airflow for a predetermined fan-only commissioning time period. The requested airflow may comprise a single requested airflow value communicated continuously over a predetermined fan-only commissioning time period based upon the operational mode selected at block 372. In some embodiments, the airflow request is dependent upon the operational mode selected at block 372. In some embodiments, the fan-only commissioning time period over which the requested airflow value is communicated from system controller 106 to indoor fan controller 142 may be approximately 3.5 minutes when the user selects the fan-only mode; however, in other embodiments the fan-only commissioning time period for the fan-only mode may vary. The climate control system (e.g., HVAC system 100) may return to the idle mode at the termination of the fan-only commissioning time period.

Block 376 may include, in addition to communicating an airflow request from system controller 106 to the indoor fan controller 142 of indoor fan 110, communicating a request from system controller 106 to outdoor controller 126 representative of, or corresponding to, a desired flow of refrigerant. For example, the system controller 106 may actuate the outdoor controller 126 to actuate compressor 116 to provide a requested refrigerant flow for a predetermined cooling/heating commissioning time period when either the cooling or heating mode is selected by the user at block 372. The amount of desired airflow and/or flow of refrigerant may be predefined by the manufacturer of the climate control system for the commissioning operation and stored in the memory of a system controller of the climate control system (e.g., stored in the memory of system controller 106 of HVAC system 100 shown in FIGS. 1, 2).

System controller 106 may communicate the requested airflow value continuously to indoor fan controller 142 over the course of the cooling/heating commissioning time period. The cooling/heating commissioning time period may be greater in duration (e.g., ten or more minutes in duration) than the fan-only commissioning time period given that the addition of heating or cooling may delay the onset of a steady state condition of the climate control system. For example, a climate control system comprising a refrigeration system may require an extended period of time (e.g., 15-20 minutes) to reach a steady state. If commissioning of the climate control system is performed concurrent with a cooling and/or heating time period (i.e., a time period required by the climate control system to cool/heat an indoor space to a target temperature and/or humidity), then the climate control system in the heating/cooling mode may need to reach a steady state, or a pre-determined period may need to elapse, before estimated airflow values identified as steady state may be considered valid for estimating input power to a fan motor of the climate control system. The climate control system (e.g., HVAC system 100) may return to the idle mode at the termination of the cooling/heating commissioning time period.

Following the transition of the climate control system from the idle mode to the selected operational mode at block 376, method 370 proceeds by collecting the single requested airflow value and plurality of estimated airflow values of the climate control system at block 378. The collection of the requested airflow value and the plurality of estimated airflow values at block 378 continues until the termination of either the fan-only commissioning time period (if the fan-only mode is selected at block 372) or the termination of the cooling/heating commissioning time period (if either the cooling or heating mode is selected at block 372), at which point the climate control system returns to the idle mode and the requested airflow returns to zero.

In some embodiments, block 378 comprises logging the requested airflow value communicated from the system controller 106 of HVAC system 100 shown in FIGS. 1, 2 to the indoor fan controller 142 of indoor unit 102, and estimated airflow values communicated from indoor fan controller 142 to system controller 106 in the memory of system controller 106 as the HVAC system 100 is operated in the fan-only, cooling, or heating mode. In some embodiments, estimated airflow values are collected at fifteen second intervals; however, in other embodiments the frequency at which estimated airflow values are collected may vary. In other embodiments, block 378 may comprise communicating the requested airflow value and periodically communicating estimated airflow values to communication network 132 for logging in a database stored in a remote server of communication network 132.

In this embodiment, estimated airflow values may be determined or estimated by system controller 106 by comparing motor speed and torque values of the motor of indoor fan 110 communicated to system controller 106 from indoor fan controller 142 with pre-created AHU maps stored on the memory of system controller 106 to thereby estimate airflow from the measured motor speed and torque. Thus, block 378 may include estimating the plurality of estimated airflow values from the motor speed and torque values of the motor of the fan of the climate control system. In other embodiments, motor speed and torque values may be communicated to a server of communication network 132 on which the AHU maps are stored, and thus, the estimation of airflow values may be performed remotely on the server of communication network 132. In still other embodiments, airflow may be measured directly via an airflow sensor positioned in an air circulation path (e.g., air circulation path 200 shown in FIG. 2) of the climate control system.

In addition to collecting the requested airflow value and plurality of estimated airflow values of the climate control system, following the transition of the climate control system from the idle mode to the selected operational mode at block 378, method 370 includes measuring speed and torque of the fan motor of the fan of the climate control system at block 308, as described above with respect to method 300 shown in FIG. 3.

As the requested airflow value and estimated airflow values are collected at block 378 and the fan motor speed and torque is measured at block 308, a steady state condition of the climate control system is identified at block 380. In some embodiments, block 380 of method 370 includes employing a moving window approach where a moving window of collected estimated airflow values having a fixed size is defined and the range of estimated airflow values within the window is examined to determine whether the range is less than a predetermined threshold range. As a non-limiting example, and not intending to be bound by any theory, the range of the moving window may be determined in accordance with the following computation, where Airflow$_{max}$ comprises the maximum estimated airflow value collected within the moving window, Airflow$_{min}$ comprises the minimum estimated airflow value collected within the moving window, and Airflow$_{mean}$ comprises the mean estimated airflow value of the estimated airflow values collected within the moving window:

$$\text{Range} = \frac{\text{Airflow}_{max} - \text{Airflow}_{min}}{\text{Airflow}_{mean}} \quad (4)$$

For example, in an embodiment where the moving window has a size of ten estimated airflow values, a first change in requested airflow (i.e., coinciding with the transition of the climate control system from the idle mode to the selected operational mode at block 376) may be identified and the first ten estimated airflow values following the identified first change in requested airflow may comprise an initial window of estimated airflow values. The range of the collected estimated airflow values may be determined in accordance with Equation (4) presented above. If the range of the estimated airflow values is less than the threshold range, then a steady state of the climate control system (e.g., HVAC system 100 shown in FIGS. 1, 2) is identified. In some embodiments, the threshold range may be approximately between 0.01-0.2; however, in other embodiments the threshold range may vary.

If the range is not less than the threshold range, then a new or second window is defined which replaces the first (earliest in time) estimated airflow value of the initial moving window with the estimated airflow value immediately following the tenth (latest in time) estimated airflow value of the initial window. Similarly, a range of the second window may be determined in accordance with Equation (4) and compared with the threshold range. If the range of the second window is less than the threshold range then a steady state condition of the climate control system is identified; however, if the range of the second window is not less than the threshold range, then a third window is created and the process continues. In some embodiments, new moving windows (e.g., third, fourth, fifth, sixth moving windows, etc.) are created until a steady state condition of the climate control system is detected. Once a steady state condition is detected, the subset of collected estimated airflow values delimited by the first estimated airflow value of the window during which steady state detection occurred and the estimated airflow value that immediately precedes a subsequent change in requested airflow are identified as collected during a steady state condition of the climate control system.

In other embodiments, the process of creating windows of estimated airflow values and comparing the range of the created window and the threshold range only occurs for a predetermined or maximum time period (which is lesser in duration than the applicable commissioning time period) of sufficient duration such that a steady state condition should have been conservatively achieved, and thus, the estimated airflow values collected at a time following the maximum time period are identified as collected during a steady state condition of the climate control system. For example, in an embodiment where the maximum time period comprises 300 seconds, if a first change in requested airflow occurs, for example, at time=0 (e.g., the transitioning of the climate control system from the idle mode to the selected operational mode at block 376), then the process of creating windows of estimated airflow values proceeds until either a steady state condition of the climate control system is detected or until a final window including an estimated airflow value collected at time=300 seconds is analyzed. In this example, if the range of the final window is greater than the threshold range then the process is terminated and the estimated airflow values collected at a time equal to or greater than 300 seconds are identified as collected during a steady state condition of the climate control system. A maximum time period allows for the identification of as much robust steady state data as possible. In some embodiments, the maximum time period may range between approximately 200-600 seconds; however, in other embodiments the maximum time period may vary.

In some embodiments, the first estimated airflow value of the initial window following an identified change in requested airflow comprises the estimated airflow value collected immediately following the change in requested airflow. However, in other embodiments, the first estimated airflow value of the initial window comprises an estimated airflow value following a predetermined minimum time period from the identified change in requested airflow. For example, in an embodiment where the minimum time period comprises 30 seconds, if a first change in requested airflow occurs, for example, at time=0, then the first estimated airflow value of the initial window occurs at 30 seconds. A minimum time period may be used to prevent steady state detection earlier than can robustly be achieved (a false positive) following a change in requested airflow (e.g., following the transitioning of the climate control system from the idle mode to the selected operational mode at block 376). In some embodiments, the minimum time period comprises approximately between 10-120 seconds; however, in other embodiments the minimum time period may vary.

Referring still to FIG. 6, once a steady state condition of the climate control system is detected at block 380, method 370 proceeds by estimating an input power of the fan motor from the input power function for the selected fan motor class at block 310, as described above with respect to method 300 shown in FIG. 3. In some embodiments, block 310 of method 370 includes estimating the input power of the fan motor for each data point collected during a steady state condition of the climate control system identified at block 380. For example, a plurality of steady state input power values may be estimated at block 310, where each estimated input power value corresponds to one of the speed and torque values measured at block 308 and collected during the steady state condition identified at block 380. In some embodiments, block 310 of method 370 may include determining an estimated mean steady state input power of the indoor fan by averaging the plurality of steady state input power values. Method 370 may also include identifying potential issues of the climate control system based on the input power estimated at block 310. For example, during installation of the climate control system, an alarm may be issued (e.g., via I/O unit 107 and/or device 130 of the HVAC system 100 shown in FIGS. 1, 2) to a user of the climate control system (e.g., an installer of the climate control system) in response to a ratio of estimated input power to estimated airflow provided by the indoor fan being greater than a predefined threshold input power to airflow ratio.

Although examples of method 370 are discussed above with respect to indoor fan 110 of the HVAC system 100 shown in FIGS. 1, 2, in other examples, the steps of method 370 described above may be performed with respect to outdoor fan 118 of HVAC system 100 to thereby estimate or verify an input power supplied to a fan motor of outdoor fan 118 as part of a process for commissioning HVAC system 100.

Referring collectively to FIGS. 1-6, through use of the systems and methods described herein (e.g., HVAC system 100, method 300, etc.), an input power supplied to a fan motor of a climate control system may be estimated. Specifically, a climate control system for an indoor space (e.g., HVAC system 100 and indoor space 201) may be operated by determining an input power function for a plurality of fan motor classes for the climate control system (e.g., determination of the input power function for the plurality of fan motor classes at block 302 of method 300 shown in FIG. 3), selecting the fan motor class of a fan motor of the climate control system (e.g., querying a user to select the fan motor class of a fan motor of the climate control system), operating the fan of the climate control system to produce an airflow (e.g., operating the fan to produce an airflow at block 306 of method 300), measuring a speed and a torque of the fan motor of the fan of the climate control system (e.g., measuring a speed and a torque of the fan motor at block 308 of method 300), and estimating an input power of the fan motor from the input power function for the selected fan motor class (e.g., estimating an input power of the fan motor at block 310 of method 300). In this manner, estimated input power supplied to the fan motor may be monitored by a user of the climate control system. For instance, an alarm may be issued to a user of the climate control system to service one or more components of the climate control system in response to an increase in the input power.

Additionally, through use of the systems and methods described herein (e.g., HVAC system 100, method 370, etc.), a commissioning of a climate control system may be performed in which an input power supplied to a fan motor of the climate control system is estimated. Specifically, a climate control system for an indoor space (e.g., HVAC system 100 and indoor space 201) may be operated by determining an input power function for a plurality of fan motor classes for the climate control system, selecting the fan motor class of a fan motor of the climate control system, querying a user of the climate control system to select an operational mode of the climate control system, transitioning the climate control system from an idle mode to the selected operational mode to operate the fan of the climate control system, collecting a requested airflow value and a plurality of estimated airflows values (e.g., requested airflow value and plurality of estimated airflow values collected at block 378 of method 370), identifying a steady state condition of the climate control system from the collected requested airflow value and the plurality of estimated airflow values (e.g., steady state identification at block 380 of method 370), and estimating an input power of the fan motor from the input power function for the selected fan motor class.

In this manner, the user of the climate control system (e.g., an installer of the climate control system or a technician equipped to service the climate control system) may verify the input power supplied to the fan motor as part of the process for commissioning of the climate control system. Additionally, the climate control system itself may be utilized for performing the commissioning procedure without needing to rely on additional personnel having specialized commissioning equipment for estimating the input power supplied to the fan motor of the climate control system.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for detecting potential issues in a climate control system by estimating input power supplied to a fan motor of the climate control system, the method comprising:
   (a) selecting an input power function of a fan motor class;
   (b) operating a fan of the climate control system to produce an airflow, wherein the fan comprises the fan motor of the fan motor class selected at (a);
   (c) measuring a speed and a torque of the fan motor;
   (d) estimating, via a processor, an input power of the fan motor by entering the speed and the torque of the fan motor measured at (c) into the input power function selected at (a); and
   (e) issuing, via the processor, an alarm to a user of the climate control system in response to an increase in the estimated input power of the fan motor, wherein the alarm provides an indication a potential issue exists with the fan motor.

2. The method of claim 1, wherein:
   (a) further comprises selecting the input power function from a plurality of input power functions of a plurality of fan motor classes; and
   the method further comprises:
   (f) communicating the fan motor class of the plurality of fan motor classes corresponding to the fan motor of the climate control system from the fan to the processor.

3. The method of claim 2, wherein the fan motor class of the fan motor is defined by a voltage and a maximum output power of the fan motor.

4. The method of claim 1, wherein the input power function is defined as:

$$W_{input} = \left\{ \frac{(A0 + A1 \times N^2 + A3 \times W_{shaft})}{(A4 + A5 \times W_{shaft} + A6 \times W_{shaft}^2 + A7 \times N + A8 \times N^2)} \right\}$$

where:
- $W_{input}$ is the input power of the fan motor estimated at (d);
- A0-A8 are a plurality of constants of the input power function determined using a known speed, a known torque, and a known input power supplied to a test fan motor of the fan motor class of the input power function;
- N is the speed of fan motor measured at (c); and
- $W_{shaft}$ is an output power of the fan motor determined from the speed and the torque measured at (c).

5. The method of claim 1, further comprising:
(f) querying a user of the climate control system to select an operational mode of the climate control system for which a commissioning of the climate control system will be performed;
(g) transitioning the climate control system from an idle mode to the selected operational mode to operate the fan of the climate control system by transmitting a requested airflow value to a fan controller of the fan, wherein the requested airflow value is based on the selected operational mode;
(h) estimating a plurality of airflow values of the fan during the operation of the fan; and
(j) identifying a steady state condition of the climate control system from the plurality of estimated airflow values.

6. The method of claim 5, wherein the input power of the fan motor estimated at (d) comprises a mean estimated input power of the fan motor for the steady state condition identified at (j).

7. The method of claim 1, wherein:
(d) further comprises estimating a plurality of input power values of the fan motor; and the method further comprises:
(f) graphically representing the plurality of input power values as a function of time.

8. A climate control system for an indoor space, the climate control system comprising:
a fan configured to produce an airflow, wherein the fan comprises a fan motor of a fan motor class;
a controller to be coupled to the fan, wherein the controller is configured to:
  operate the fan of the climate control system to produce the airflow; and
  measure a speed and a torque of the fan motor as the fan produces the airflow;
a memory coupled to a processor, wherein the memory includes instructions executable by the processor to cause the processor to:
  store an input power function of the fan motor class;
  estimate an input power of the fan motor by entering the measured speed and torque of the fan motor into the input power function stored in the controller; and
  issue an alarm to a user of the climate control system in response to an increase in the estimated input power of the fan motor, wherein the alarm provides an indication a potential issue exists with the fan motor.

9. The climate control system of claim 8, wherein the memory further includes instructions executable by the processor to cause the processor to:
store a plurality of the input power functions for a plurality of fan motor classes; and
receive a communication from the fan of the climate control system indicating the fan motor class of the plurality of fan motor classes corresponding to the fan motor of the climate control system.

10. The climate control system of claim 8, wherein the fan motor class of the fan motor is defined by a voltage and maximum output power of the fan motor.

11. The climate control system of claim 8, wherein the controller is configured to determine an output power of the fan motor from the measured speed and the measured torque of the fan motor.

12. The climate control system of claim 11, wherein the input power function is defined as:

$$W_{input} = \left\{ \frac{(A0 + A1 \times N^2 + A3 \times W_{shaft})}{(A4 + A5 \times W_{shaft} + A6 \times W_{shaft}^2 + A7 \times N + A8 \times N^2)} \right\}$$

where:
- $W_{input}$ is the input power of the fan motor estimated by the input power function;
- A0-A8 are a plurality of constants of the input power function determined using a known speed, a known torque, and a known input power supplied to a test fan motor of the fan motor class of the input power function;
- N is the measured speed of the fan motor; and
- $W_{shaft}$ is an output power of the fan motor.

13. The climate control system of claim 8, wherein the controller is configured to:
query a user of the climate control system to select an operational mode of the climate control system for which a commissioning of the climate control system will be performed;
transition the climate control system from an idle mode to the selected operational mode to operate the fan by transmitting a requested airflow value to a fan controller of the fan, wherein the requested airflow value is based on the selected operational mode;
estimate a plurality of airflow values of the fan during the operation of the fan; and
identify a steady state condition of the climate control system from the plurality of estimated airflow values.

14. The climate control system of claim 13, wherein the estimated input power of the fan motor comprises a mean estimated input power of the fan motor for the identified steady state condition.

15. The climate control system of claim 8, wherein the fan comprises an indoor fan of the climate control system configured to produce the airflow through the indoor space.

16. The climate control system of claim 8, wherein a remote server configured to be in signal communication with the controller comprises the memory.

17. The climate control system of claim 8, wherein the controller comprises the memory.

18. The climate control system of claim 8, wherein the memory further includes instructions executable by the processor to cause the processor to:
estimate a plurality of input power values of the fan motor; and
graphically represent the plurality of input power values as a function of time.

* * * * *